(12) United States Patent
Maguire (10) Patent No.: US 9,796,123 B2
(45) Date of Patent: Oct. 24, 2017

(54) DRIPLESS LIQUID COLOR FEED THROAT ADAPTOR AND METHOD FOR DRIPLESS LIQUID COLOR DELIVERY

(71) Applicant: Stephen B. Maguire, West Chester, PA (US)

(72) Inventor: Stephen B. Maguire, West Chester, PA (US)

(*) Notice: Subject to any disclaimer, the term of this patent is extended or adjusted under 35 U.S.C. 154(b) by 804 days.

(21) Appl. No.: 14/105,958

(22) Filed: Dec. 13, 2013

(65) Prior Publication Data

US 2015/0165662 A1    Jun. 18, 2015

(51) Int. Cl.
| | | |
|---|---|---|
| *B29C 47/00* | (2006.01) | |
| *B29C 47/10* | (2006.01) | |
| *B29C 45/18* | (2006.01) | |
| *B29C 47/08* | (2006.01) | |
| *B29L 31/00* | (2006.01) | |

(52) U.S. Cl.
CPC ...... *B29C 47/1063* (2013.01); *B29C 45/1816* (2013.01); *B29C 47/0813* (2013.01); *B29C 47/1009* (2013.01); *B29L 2031/00* (2013.01); *Y10T 137/0318* (2015.04); *Y10T 137/85978* (2015.04)

(58) Field of Classification Search
CPC . B29C 49/92; B29C 47/1063; B29C 45/1816; B29C 47/0813
USPC ......... 366/76.1, 76.2, 76.3, 76.4, 76.5, 76.6, 366/76.7, 76.8, 76.9, 76.91, 76.92, 76.93
See application file for complete search history.

(56) References Cited

U.S. PATENT DOCUMENTS

| | | |
|---|---|---|
| 600,233 A | 3/1898 | Palm |
| 1,451,759 A | 4/1923 | Bruhn |
| 1,482,376 A | 2/1924 | Anderson |
| 1,489,348 A | 4/1924 | Hampton |
| 2,188,646 A | 1/1940 | Bunch |
| 2,199,657 A | 5/1940 | Bunch |
| 2,387,233 A | 10/1945 | Clapp |
| 2,606,696 A | 8/1952 | Miner |
| 2,656,828 A | 10/1953 | Conover |
| 2,665,825 A | 1/1954 | Poitras et al. |
| 2,701,881 A | 2/1955 | McGee |

(Continued)

FOREIGN PATENT DOCUMENTS

| | | |
|---|---|---|
| CN | 2809263 Y | 8/2006 |
| DE | 3433693 A1 | 3/1986 |

(Continued)

OTHER PUBLICATIONS

Forty-four page two-sided brochure including cover and back pages entitled "Maguire: Auxiliary equipment for the plastics industry" of Maguire Products, Inc., Oct. 2000.

(Continued)

*Primary Examiner* — Tony G Soohoo
*Assistant Examiner* — Anshu Bhatia
(74) *Attorney, Agent, or Firm* — Fox Rothschild LLP (57) ABSTRACT

Apparatus and methods for converting granular plastic resin into colored finished or semi-finished plastic parts include a process machine having a barrel with a vertically opening feed throat, a rotatable screw inside the barrel, and a color feed conduit assembly positioned at least partially within the process machine and extending into the barrel for passage of liquid color downwardly through the color feed conduit assembly into proximity with the screw.

23 Claims, 8 Drawing Sheets

(56) References Cited

U.S. PATENT DOCUMENTS

| | | | |
|---|---|---|---|
| 2,873,892 A | 2/1959 | Nelson et al. |
| 2,909,315 A | 10/1959 | Sampietro |
| 2,956,822 A | 10/1960 | Kates |
| 3,391,645 A | 7/1968 | Koza |
| 3,477,698 A | 11/1969 | Smith et al. |
| 3,518,033 A | 6/1970 | Anderson |
| 3,785,412 A | 1/1974 | Stone |
| 3,814,388 A | 6/1974 | Jakob |
| 3,883,275 A | 5/1975 | Browne |
| 3,957,399 A | 5/1976 | Siczek |
| 3,988,088 A | 10/1976 | King et al. |
| 3,998,103 A | 12/1976 | Bjorklund et al. |
| 4,185,948 A | 1/1980 | Maguire |
| 4,469,127 A | 9/1984 | Kitamura |
| 4,473,173 A | 9/1984 | DeGroff et al. |
| 4,501,405 A | 2/1985 | Usry |
| 4,571,416 A | 2/1986 | Jarzombek et al. |
| 4,586,882 A | 5/1986 | Tseng |
| 4,605,297 A | 8/1986 | Livingston et al. |
| 4,606,710 A | 8/1986 | Maguire |
| 4,621,990 A | 11/1986 | Forsythe et al. |
| 4,657,490 A | 4/1987 | Abbott |
| 4,759,189 A | 7/1988 | Stropkay |
| 4,834,071 A | 5/1989 | Hosoi et al. |
| 4,921,132 A | 5/1990 | Wales |
| 4,967,940 A | 11/1990 | Blette et al. |
| 5,039,279 A | 8/1991 | Natwick et al. |
| 5,116,547 A | 5/1992 | Tsukahara et al. |
| 5,199,852 A | 4/1993 | Danby |
| 5,215,215 A | 6/1993 | Sauer |
| 5,225,210 A * | 7/1993 | Shimoda ............ B29C 45/1816 264/40.4 |
| 5,318,431 A * | 6/1994 | Chang .................... B29C 47/92 264/211 |
| 5,344,232 A | 9/1994 | Nelson et al. |
| 5,364,242 A | 11/1994 | Olsen |
| 5,609,191 A | 3/1997 | Topping |
| 5,622,392 A | 4/1997 | Gochenouer |
| 5,853,244 A | 12/1998 | Hoff et al. |
| 5,953,923 A | 9/1999 | Davies |
| 5,980,490 A | 11/1999 | Tsoukalis |
| 5,984,777 A | 11/1999 | Kuchar |
| 5,988,983 A | 11/1999 | Furusawa |
| 6,007,236 A | 12/1999 | Maguire |
| 6,057,514 A | 5/2000 | Maguire |
| 6,188,936 B1 | 2/2001 | Maguire et al. |
| 6,213,739 B1 | 4/2001 | Phallen et al. |
| 6,386,841 B1 | 5/2002 | Probst |
| 6,402,363 B1 | 6/2002 | Maguire |
| 6,502,013 B1 | 12/2002 | Sosnik |
| 6,523,451 B1 | 2/2003 | Liao |
| 6,599,005 B2 | 7/2003 | van Der Wei |
| 6,669,358 B2 | 12/2003 | Shimoda |
| 6,719,453 B2 | 4/2004 | Cosman et al. |
| 6,880,965 B1 | 4/2005 | Sheffield, Jr. |
| 6,991,004 B2 | 1/2006 | Kaufhold et al. |
| 7,118,349 B2 | 10/2006 | Oglesby |
| 7,154,069 B1 | 12/2006 | Gordon |
| 7,201,290 B2 | 4/2007 | Mehus |
| 7,311,882 B1 | 12/2007 | Renzi |
| 7,390,119 B2 | 6/2008 | Maguire |
| 7,416,096 B2 | 8/2008 | Maguire |
| 7,594,717 B2 | 9/2009 | Sheinman |
| 7,980,834 B2 | 7/2011 | Maguire |
| 8,042,578 B2 | 10/2011 | Post |
| 8,627,852 B2 | 1/2014 | Hatton |
| 8,757,217 B2 | 6/2014 | Maguire |
| 8,800,821 B2 | 8/2014 | Maguire et al. |
| 9,188,118 B2 | 11/2015 | Maguire |
| 2002/0023449 A1 | 2/2002 | Park et al. |
| 2002/0031822 A1 | 3/2002 | Van Der Wei et al. |
| 2002/0122103 A1 | 9/2002 | Yamamoto et al. |
| 2002/0189667 A1 | 12/2002 | O'Dougherty et al. |
| 2003/0071868 A1 | 4/2003 | Koshikawa et al. |
| 2003/0142580 A1 | 7/2003 | Maguire |
| 2003/0218014 A1 | 11/2003 | Gregory et al. |
| 2005/0052945 A1 | 3/2005 | Maguire |
| 2005/0126638 A1 | 6/2005 | Gilbert |
| 2006/0067844 A1 | 3/2006 | Iversen |
| 2007/0071624 A1 | 3/2007 | Brewer |
| 2010/0322644 A1 | 12/2010 | Ajima |
| 2012/0195771 A1 | 8/2012 | Brender a Brandis |
| 2013/0334258 A1 | 12/2013 | Maguire |
| 2014/0087035 A1 | 3/2014 | Cummings |
| 2014/0147288 A1 | 5/2014 | Maguire |
| 2014/0224830 A1 | 8/2014 | Maguire |
| 2015/0020713 A1 | 1/2015 | Maguire |
| 2015/0066794 A1 | 3/2015 | Maguire et al. |
| 2015/0108748 A1 | 4/2015 | Maguire |
| 2016/0040661 A1 | 2/2016 | Maguire |

FOREIGN PATENT DOCUMENTS

| | | |
|---|---|---|
| FR | 1 477 595 A | 4/1967 |
| GB | 1145752 | 3/1969 |
| JP | 3550699 B2 | 8/2004 |
| WO | WO 01/49374 A1 | 7/2001 |

OTHER PUBLICATIONS

Two-sided color brochure entitled Maguire: Model MPA Liquid Color Pump, Maguire Products, Inc., published Dec. 28, 1995.
International Search Report for PCT/US02/02934, dated Feb. 20, 2003.
Written Opinion for PCT/US02/02934, dated Mar. 24, 2003.
International Search Report for PCT/US11/021994, dated May 24, 2011.
Written Opinion for PCT/US11/021994, dated May 24, 2011.
Thirty-two page catalog entitled "Maguire Color Blending Equipment" published by Maguire Products, Inc., 1993, United States.
Wayback Machine of SMC Linear Actuators Sep. 11, 2011, SMC, Accessed on Apr. 6, 2016.
Wayback Machine of SMC Linear Actuator C02 Series Catalog, Sep. 11, 2011, SMC, Accessed on Apr. 6, 2016.
International Search Report for PCT/US2014/070264 dated Apr. 15, 2015.
Written Opinion for PCT/US2014/070264 dated Apr. 15, 2015.

* cited by examiner

DRIPLESS LIQUID COLOR FEED THROAT ADAPTOR AND METHOD FOR DRIPLESS LIQUID COLOR DELIVERY

BACKGROUND OF THE INVENTION

Field of the Invention

This invention relates to molding and extrusion of plastic resin pellets to produce finished and semi-finished plastic products, and more particularly relates to using liquid color to color those finished and semi-finished plastic parts as the parts are being molded or extruded.

Description of the Prior Art

In the plastics industry, injection molding machines and extruders (herein collectively referred to as "process machines") include a screw inside a barrel for melting the plastic resin pellets by working it by action of the screw against the resin as the screw rotates, driving the melted plastic forward through the barrel. The plastic resin pellets are fed into the barrel at one end of the barrel. At this end, referred to as the "feed end", there is an opening in the barrel, above the screw, through which the plastic resin pellets fall by gravity into the barrel adjacent to and in contact with the screw. This opening is referred to as the "feed throat" of the process machine.

A hopper or other plastic resin pellet delivery apparatus is positioned above the feed throat. When liquid color is used to color the finished or semi-finished plastic products produced by molding or extrusion, the goal is to deliver the liquid color directly into the area of the screw in such a way that the liquid color will not come in contact with other surfaces before contacting the screw. Problems can arise if the liquid color contacts any portion of the feed throat as the liquid color is being fed to the screw. Liquid color for coloring plastics is extremely viscous, somewhat like tar, and hence is very difficult to handle!

When liquid color is used to color a molded or extruded product, the liquid color is delivered directly into the plastic molding or extrusion process. The goal is to deliver the liquid color into the screw area in such a way that liquid color will not come into contact with other surfaces before entering the barrel and effectively being drawn into the resin by the rotating action of the screw within the barrel. If the liquid color touches even the sides of the feed throat, this can present a problem due to the difficulty of clean up and the possibility of contamination of one color with another when color changeover is effectuated.

In the prior art, the most accepted way to introduce liquid color into the screw barrel and adjacent to the rotatable screw is to introduce the liquid color through a guide tube that passes through the feed throat and has its outlet end positioned close to the screw, so the liquid color does not exit the guide tube until it is well past the surfaces of the feed throat and other components, where spillage of the liquid color on to those surfaces could cause a problem. Contact of liquid color on those surfaces must be avoided to avoid the difficulties of clean-up and the problems of cross-color contamination.

Currently, the most widely used technique introduces the liquid color to the screw through a tube that is inserted into the feed throat, with the outlet of the tube positioned very close to the screw. With the tube outlet being positioned very close to the screw, liquid color does not exit the tube until the liquid color is well past all surfaces of the feed throat and other surfaces where a problem might arise if those surfaces were contacted by the liquid color.

In current practice this is accomplished by first installing an adaptor plate, which is typically about ¾ of an inch thick, over the opening to the feed throat. The opening to the feed throat is underneath a hopper or other device supplying plastic resin pellets to the process machine. The adaptor plate is preferably sandwiched between the hopper and the opening to the feed throat. The adaptor plate typically has a slot milled into it, allowing a short length of rigid copper tubing to be permanently positioned in the slot. The rigid tubing is typically ⅝ inch outer diameter, ½ inch inner diameter copper tubing. This rigid copper tubing provides a controlled fixed path leading from outside the process machine into and through the feed throat to a point just above the screw. This permits a smaller color delivery tube to be inserted into the rigid copper tube. The larger, rigid tube is formed in such a way as to direct the smaller color delivery tube downwardly to a desired point very close to the surface of the screw at the bottom of the feed throat below the adaptor plate.

The smaller, color delivery tube is flexible and is inserted into the rigid tube and removed from the rigid tube as required.

In the prior art, changing colors to produce parts of different color requires that the color delivery tube be removed and another color delivery tube, for use in supplying a new color, be inserted into the rigid tube. When there is to be a changeover in color for parts being fabricated by a given process machine, the new color must be delivered using a new, clean color delivery tube. or a color delivery tube that has previously been used to deliver that very same color. In this way, the color delivery tubes do not need to be cleaned, and there is no danger of cross-contamination of colors. Each color has its own dedicated color delivery tube.

A problem with current liquid color delivery systems as described immediately above is that when a color delivery tube is withdrawn, liquid color will drip from the open outlet end of the color delivery tube. Any dripping of the liquid color creates a mess that is difficult to clean up due to the high viscosity, staining and other properties of liquid color. Typically, the mess only gets worse and worse as time passes using current liquid color delivery techniques.

SUMMARY OF THE INVENTION

In contrast to the long-known, standard method of supplying liquid color to a process machine, which method involves running a single long liquid color delivery tube all the way from a drum of liquid color through and into the process machine by way of a copper guide tube, the instant invention provides a delivery system where part of the color delivery system stays with the process machine, remaining inside the guide tube, and is never removed from the machine. The color delivery tube stays within the guide tube, is fixed thereto, and is never removed, so that the inlet end of the color delivery tube, which is outside the process machine, may be maintained open. If the color delivery tube were to be pulled out as in the prior art, it would drip liquid color; but in the instant invention the color delivery tube remains in place within the guide tube. Consequently, the operator of the process machine never has to deal with the issue of dripping liquid color.

In one of its aspects, this invention provides apparatus for converting granular plastic resin into colored finished or semi-finished plastic parts. The apparatus includes a process machine having a barrel preferably with a vertically opening feed throat. The process machine further includes a rotatable screw located within the barrel and preferably a plate covering the feed throat. The plate desirably has an aperture therethrough and a slot formed therein extending from the aperture to an edge of the plate.

The apparatus further preferably includes a color feed conduit assembly positioned at least partially within the process machine and extending into the barrel for passage of liquid color downwardly through the color feed conduit assembly into proximity with the screw. The color feed conduit assembly preferably includes a relatively rigid but yet bendable, preferably aluminum outer color delivery tube and an inner flexible color delivery tube, which is preferably Teflon brand polytetrafluoroethylene fluoropolymer or another equally suitable polymer material, telescopically disposed within the outer color delivery tube.

The color feed conduit assembly is desirably positioned at least partially in a slot in the plate. The slot extends from the aperture to an edge of the plate. The color feed conduit assembly is positioned to pass downwardly through the aperture with an outlet of the color feed conduit assembly being in proximity with the screw.

The apparatus preferably still further includes a color conveying tube, a self-sealing quick release tubular fitting connecting the color conveying tube to the color feed conduit assembly, and a pneumatically powered pump. The pump serves to pump liquid color from a supply thereof remote from the process machine through the color conveying tube and the color feed conduit assembly into proximity with the rotatable screw.

The invention further provides a quick disconnect fitting on the inlet end of the both the guide tube and the inner color delivery tube, outside the process machine. A liquid color transport tube for conveying the liquid color from a liquid color container to a process machine has a quick disconnect connection, which is connected to the fixed-in-place color delivery tube, which stays in position within the process machine. When color is supplied, it is supplied out of a long, larger diameter tube, which is connected to the fixed-in-place inner color delivery tube. The liquid color is pumped through the fixed-in-place inner color delivery tube into the feed throat of the machine where the color is required.

The fixed-in-place inner color delivery tube within the machine is a small diameter, preferably Teflon brand polytetrafluoroethylene fluoropolymer tube and is quite short in length. As a result, the fixed-in-place inner color delivery tube purges very quickly when a color change is required. With this approach, where the inner tube having a small diameter stays in place in the machine, the risk of dripping is eliminated. This is because in this aspect of the invention, the fixed-in-place color delivery tube is not pulled out or removed from the process machine and the inlet end of the fixed-in-place color delivery tube is preferably positioned to be higher than the outlet end of the fixed-in-filed color delivery tube, with the outlet end being proximate the process machine screw.

In still another one of its aspects this invention relates to apparatus for feeding liquid color to a process machine for converting granular plastic resin into finished or semi-finished plastic parts by molding or extrusion. In this aspect, the process machine preferably has a rotatable screw preferably located inside a barrel, with the barrel having a vertically opening feed throat with a plate covering the feed throat. The plate preferably has an aperture therethrough with a feed tube preferably positioned therein for passage of liquid color downwardly through the feed tube into proximity with the screw.

In this one of its aspects the invention provides an improvement to such apparatus, including a color feed conduit assembly, where the assembly includes a rigid aluminum outer color delivery tube and an inner flexible preferably Teflon brand polytetrafluoroethylene fluoropolymer, or another equally suitable polymer material, color delivery tube preferably telescopically disposed within the outer color delivery tube. The color feed conduit assembly is desirably positioned at least partially within a slot in the plate that extends from the aperture to an edge of the plate.

The color feed conduit assembly passes downwardly through the aperture, with an outlet of the color feed conduit assembly being in proximity with the screw. The improvement yet further preferably includes a color conveying tube, a tubular self-sealing quick release fitting connecting the color conveying tube to the color feed conduit assembly, and a pneumatically powered pump. The pump serves to pump liquid color from a supply thereof remote from the process machine through the color conveying tube and the color feed conduit assembly into proximity with the rotatable screw.

In one of its aspects, this invention provides a method for supply and changeover of liquid color as supplied to plastic molding and extrusion machines, where the method includes selecting a length of a first flexible tubular conduit for conveying liquid color from a container of liquid color to within a selected distance of a process machine. The method proceeds with connecting a container of liquid color to a first end of the first flexible tubular conduit, remote from the process machine, using a self-sealing quick disconnect connector. The method further proceeds by positioning a fixed-in-place inner color delivery tube within a guide tube leading through the feed throat of the process machine. The method further proceeds by connecting the second end of the first flexible tubular conduit to the inlet end of the fixed-in-place color delivery tube by connecting shutoff-equipped quick disconnect connectors at the ends of the respective tubes. The method further proceeds by repeatedly applying air pressure to a flexible diaphragm portion of a liquid color pump associated with a liquid color container, thereby flexing the diaphragm against the liquid color and pumping the liquid color through the first flexible tubular conduit towards the process machine. In this aspect of the invention, the method concludes with uncoupling the end of the first flexible tubular conduit from the container of liquid color and coupling that end to a second container of liquid color, to changeover to a different color if desired.

The method as described in the preceding paragraph further includes a method wherein the selected distance is the maximum distance the liquid color pump can pump liquid color through a conduit having diameter equal of the first flexible tubular conduit.

In another one of its aspects, this invention provides a method for supplying liquid color into proximity with the rotating screw of a process machine for converting granular plastic resin into finished or semi-finished plastic parts by molding or extrusion. The rotatable screw is preferably within a barrel portion of the process machine and the barrel preferably has a vertically opening feed throat for passage of liquid color therethrough downwardly towards the screw. The method proceeds by covering the feed throat with a plate having an aperture therethrough and a slot therein connecting the aperture with an edge of the plate.

The method then preferably proceeds by positioning a telescoping color delivery tube assembly in the slot and extending downwardly through the aperture with the delivery tube assembly outlet in proximity with the screw. Preferably the method yet further proceeds by providing a pneumatically powered pump for pumping liquid color from a supply thereof to the process machine for delivery to the screw through the delivery tube assembly. The method still further proceeds by preferably providing a color conveying conduit connecting an outlet of the pump to the delivery tube assembly via at least one self-sealing quick release tubular fitting. The method may conclude with actuating the pump by application of compressed air thereto.

DESCRIPTION OF THE INVENTION, THE PREFERRED EMBODIMENTS THEREOF AND BEST MODE FOR PRACTICE OF THE INVENTION

In this invention, soft aluminum tubing is used to fabricate a relatively rigid outer color delivery tube portion of a color feed conduit assembly. Soft aluminum tubing can be formed into a curve in the same manner that copper tubing can be formed; aluminum tubing is substantially lower in cost.

The invention further utilizes a compression fitting installed on the inlet end of the aluminum outer color delivery tube. The inlet end of the outer color delivery tube is exposed, outside the process machine. A compression adaptor fitting fits on to the aluminum outer color delivery tube. The compression fitting end is tightened, resulting in swaging the compression ferrule permanently onto the inlet end of the aluminum outer color delivery tube. The swaging locks the ferrule in place. A compression nut is also captured on the outer color delivery tube at the inlet end.

An adaptor fitting is provided for connection to the color delivery tube inlet end. The adaptor fitting can be removed by unscrewing the adaptor fitting from the compression nut. This facilitates easy removal of the adaptor fitting.

The adaptor fitting includes a quick disconnect-type male connector screwed into it. The adaptor fitting holds a preferable Teflon brand polytetrafluoroethylene fluoropolymer inner color delivery tube capture within the adaptor fitting. In the practice of the invention, the preferable Teflon brand polytetrafluoroethylene fluoropolymer tube does not need to be removed for color changeover. Other polymers may also be used for the inner color delivery tube.

A color conveying tube designated generally 214 connects the outlet of a liquid color pump 14, which draws liquid color from a container 12 of liquid color, to a process machine 200. A quick disconnect tubular shutoff female portion 248 is on the outlet end of the color conveying tube 214. With the quick disconnect tubular shutoff female portion 248 in place on the outlet end of the color conveying tube 214, when color conveying tube 214 is disconnected from the color feed conduit assembly 209 consisting of the aluminum relatively rigid outer color delivery support tube 210 and the preferable Teflon brand polytetrafluoroethylene fluoropolymer flexible inner color delivery tube 212, color conveying tube 214 seals shut and no liquid color can drip therefrom.

When the color needs to be changed, color conveying tube 214 can be disconnected from color feed conduit assembly 209 without any drip of liquid color. The short length of the preferable Teflon brand polytetrafluoroethylene fluoropolymer inner color delivery tube 212 that remains within process machine 200, inside the preferable aluminum outer color delivery support tube 210, is purged by the new liquid color as the new liquid color is introduced into the inner color delivery tube 212.

With this arrangement, there is no problem of cross-contamination during color changes because (1) the length of inner color delivery tube 212 is short, typically less than 16 inches; (2) the 16 inch or shorter length inner color delivery tube 212 has a small inner diameter, typically about 3/16 inch; and (3) inner color delivery tube 212 is preferably Teflon brand polytetrafluoroethylene fluoropolymer so it cleans out easily, with little or none of the previous liquid color remaining as the new color begins to flow through inner color delivery tube 212.

Teflon brand polytetrafluoroethylene fluoropolymer, or a similar equivalent polymer, is ideal for inner color delivery tube 212 because Teflon brand polytetrafluoroethylene fluoropolymer and equivalent suitable polymers resist the heat inherently generated during operation of process machine 200, which can reach temperatures of 500 degrees Fahrenheit or more.

If, for some reason, the preferable Teflon brand polytetrafluoroethylene fluoropolymer inner color delivery tube 212 must be removed, this is easily accomplished by loosening compression fitting 216 and removing preferable Teflon brand polytetrafluoroethylene fluoropolymer inner color delivery tube 212 from the color feed conduit assembly 209.

A liquid color pump 14 powered by air pressure is desirably used to pump the liquid color through color conveying tube 214 and the preferable Teflon brand polytetrafluoroethylene fluoropolymer inner color delivery tube 212 residing within the aluminum outer color delivery support tube 210. If preferable Teflon brand polytetrafluoroethylene fluoropolymer inner color delivery tube 212 is removed, the quick disconnect non-drip female portion of the coupling closes, sealing the color conveying tube 214. There is no risk of building up too much pressure in the color conveying tube 214 or the aluminum outer color delivery support tube 210, since pressure of liquid color in the system is inherently limited to the pressure of the air furnished via air supply line 45 to drive liquid color pump 14.

A major advantage of the invention over other pumping systems is that other pumping systems use positive displacement pumps that deliver liquid color at very high pressure.

Such positive displacement pumps will blow a fitting off the end of a color conveying tube or will burst a color conveying tube if the outlet end is closed off. Utilization of the self-sealing quick disconnect tubular shutoff 248 at the outlet end of color conveying tube 214 avoids this problem.

Diameter of color delivery tubes has a dramatic effect on back pressure. A small diameter tube that is too short will cause excessive back pressure. One-piece delivery tubes must be large, sometimes as large as ⅜ or ½ inch inside diameter. One quarter inch inside diameter is considered the industry standard. The inventive use of a short final length Teflon brand polytetrafluoroethylene fluoropolymer inner color delivery tube allows the inner color delivery tube to be a smaller inner diameter.

A further advantage of the invention is that compression fitting 216 securing preferable Teflon brand polytetrafluoroethylene fluoropolymer inner color delivery tube 212 in place within rigid outer color delivery support tube 210 provides a way to remove and replace preferable Teflon brand polytetrafluoroethylene fluoropolymer inner color delivery tube 212 very easily.

Figure 2:
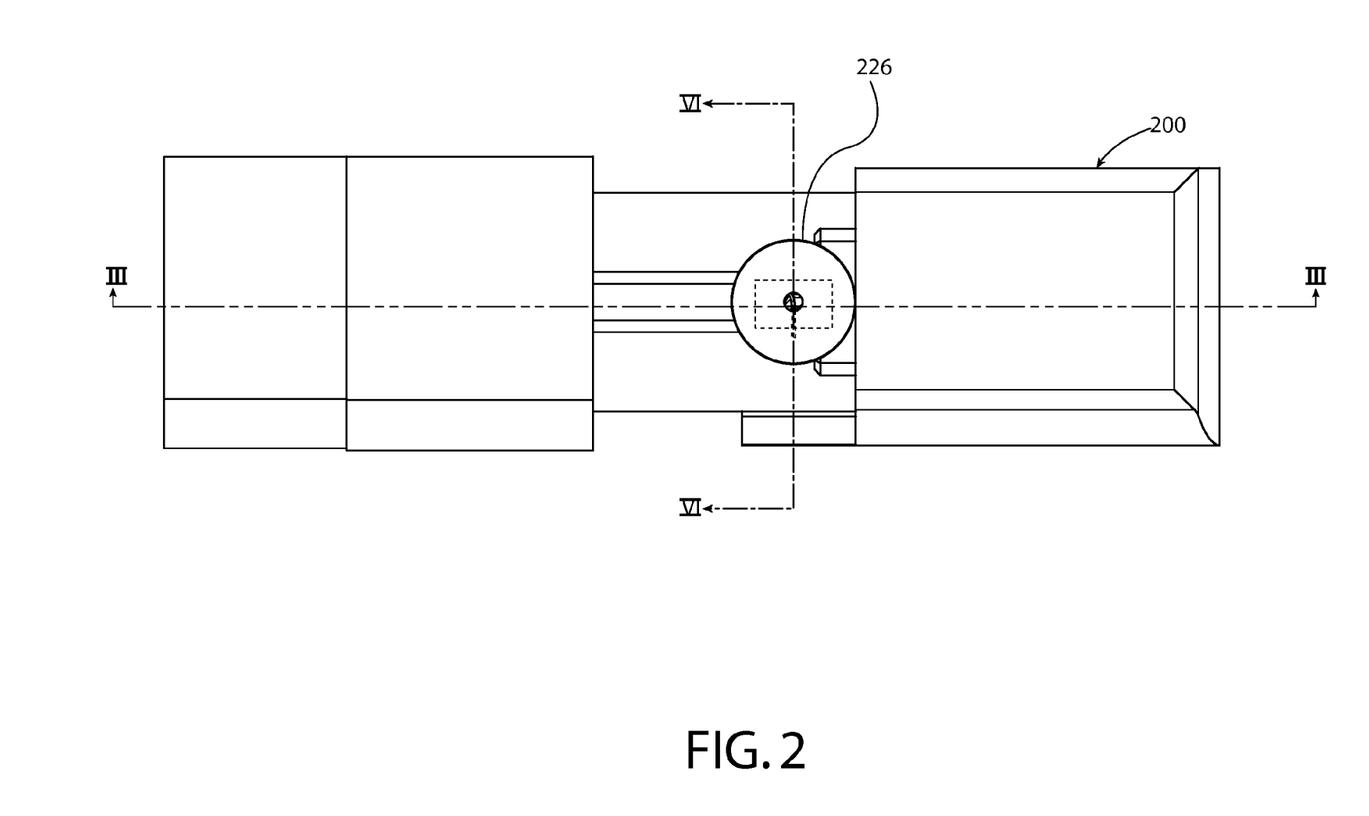
FIG. 2 is a top view, in schematic form, of a process machine in the form of an injection molding press embodying aspects of the invention.
Figure 3:
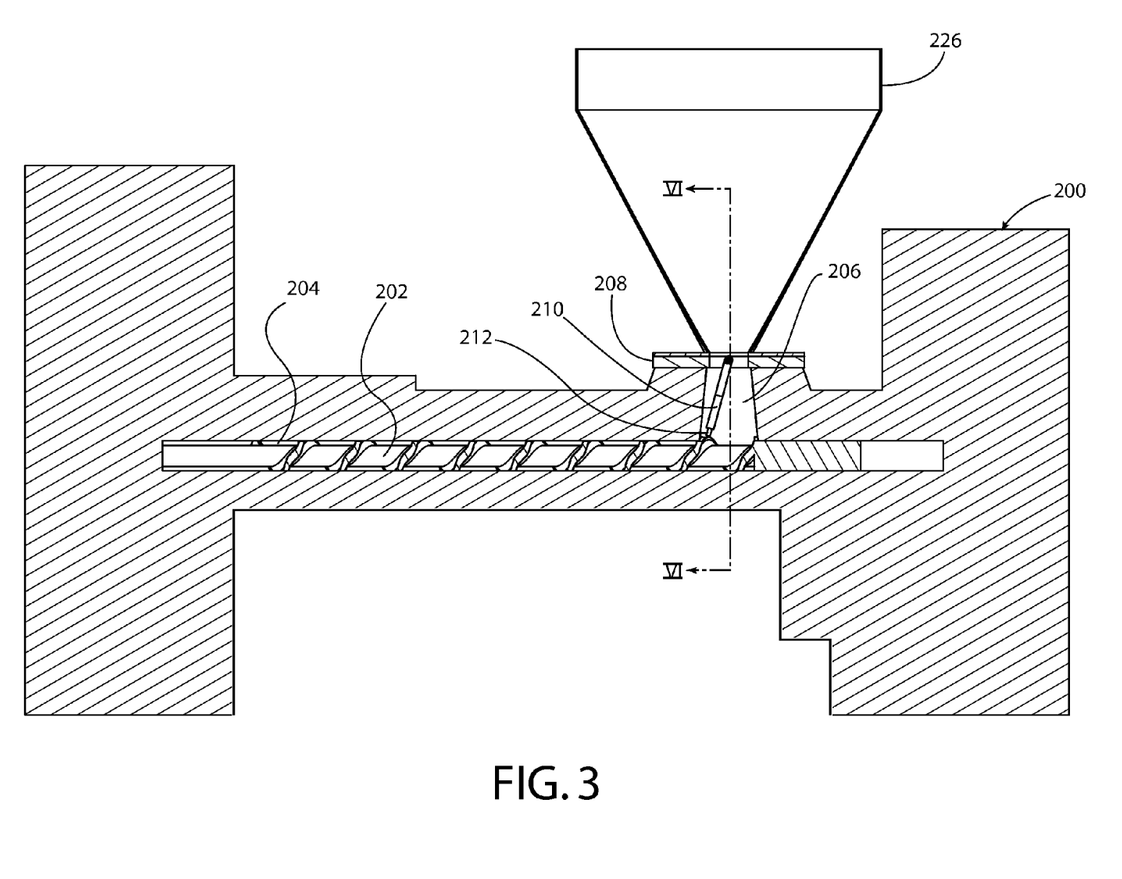
FIG. 3 is a schematic side elevation in section taken at III-III in FIG. 2.
Figure 4:
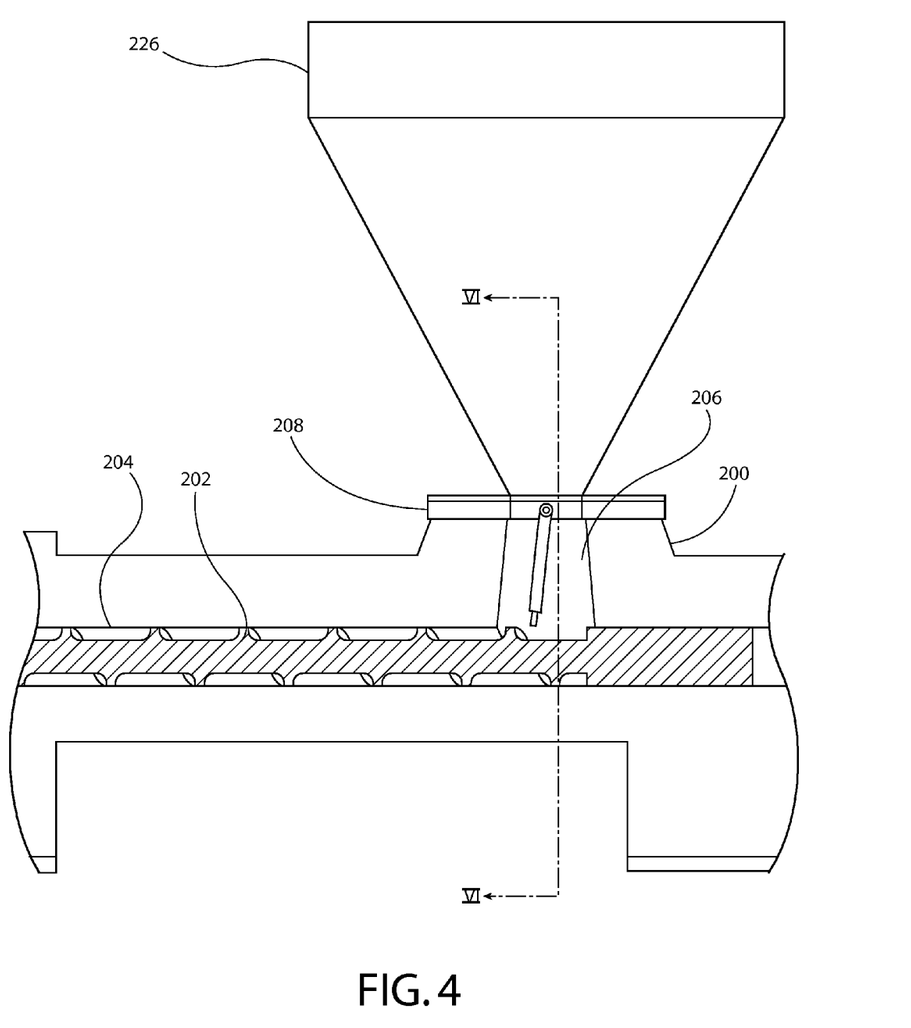
FIG. 4 is an enlarged broken schematic side elevation of a portion of the process machine illustrated in FIG. 3.
Figure 5:
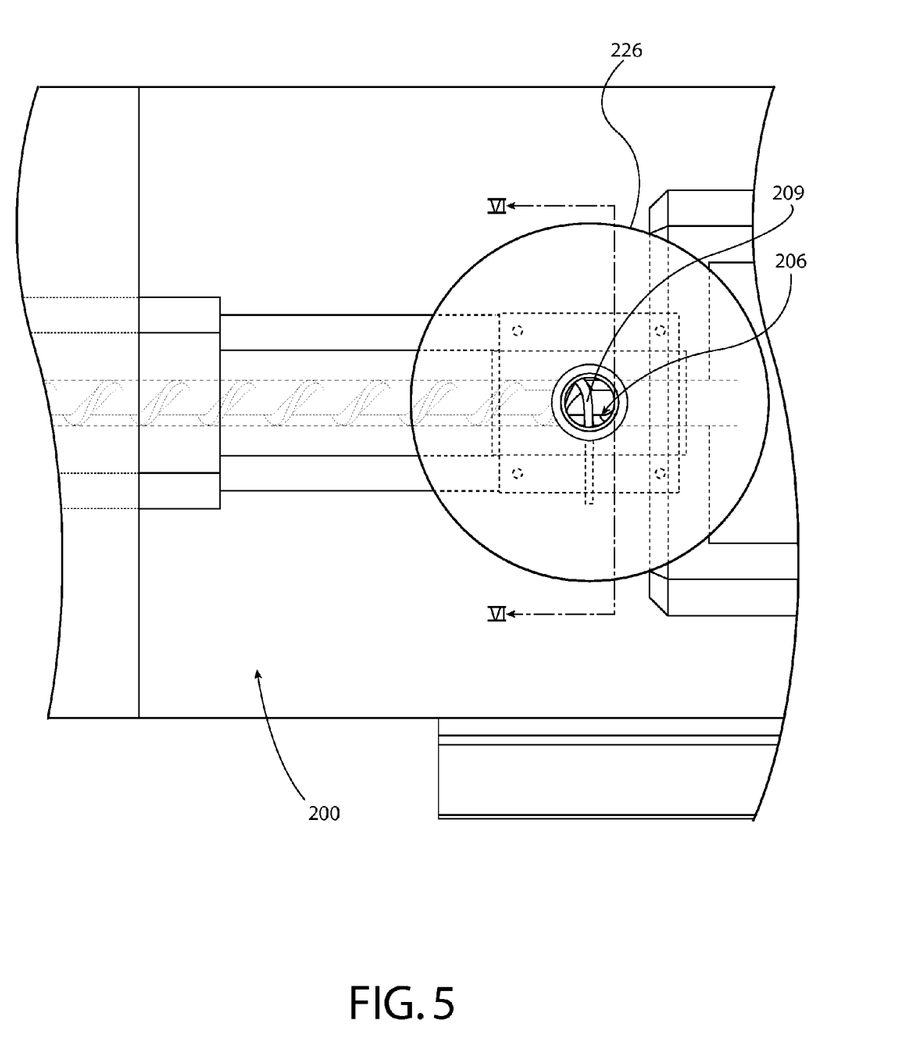
FIG. 5 is an enlarged broken top view of a portion of the process machine illustrated in FIG. 2.
Figure 6:
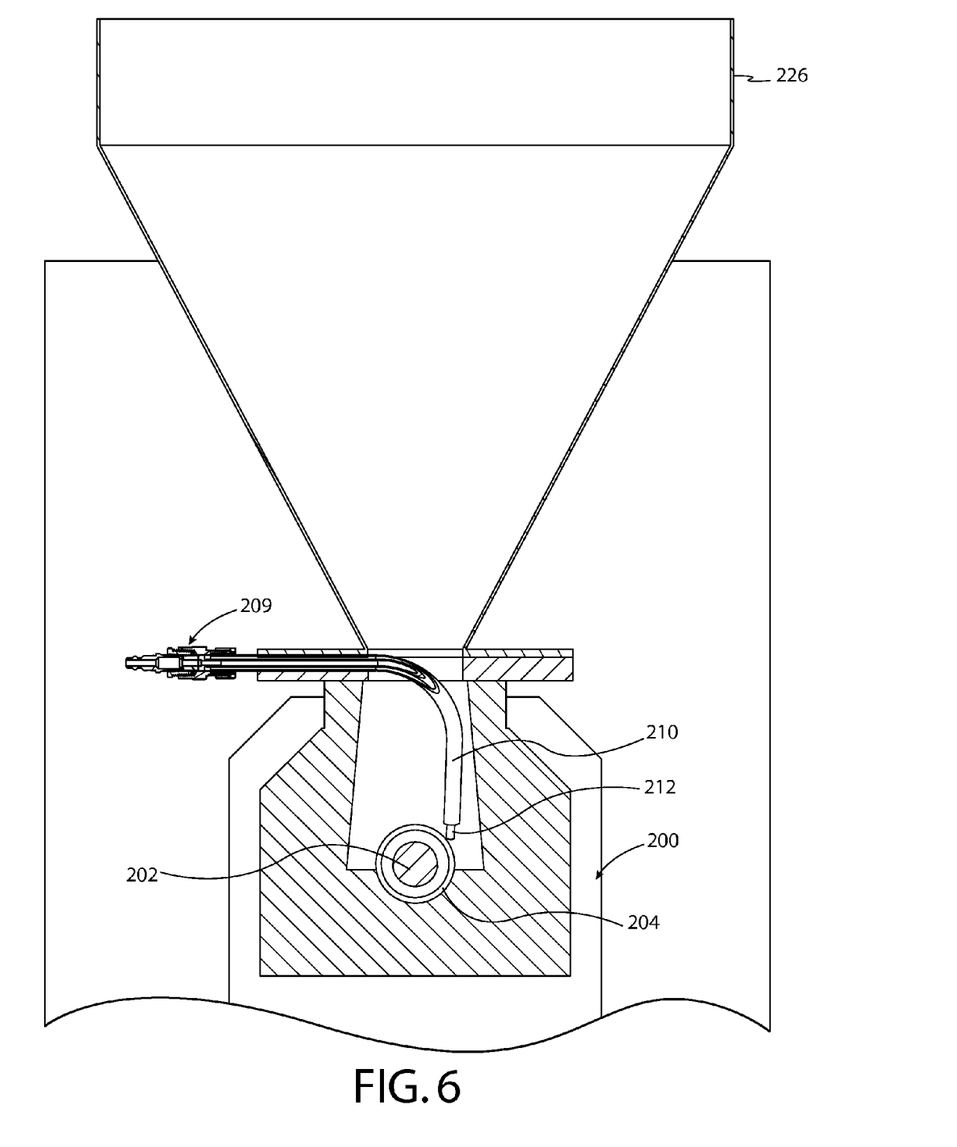
FIG. 6 is a broken schematic side sectional view of a portion of the process machine illustrated in FIGS. 2, 3, 4, and 5, taken at VI-VI in FIGS. 2, 3, 4, and 5.

In the drawings, process machine 200 is illustrated in schematic form as an injection molding press and includes a screw 202 within a barrel 204, as particularly well-illustrated in FIGS. 2 and 3. Process machine 200 includes a feed throat 206 in the form of an opening above barrel 204. Plastic resin pellets to be molded into a finished or semi-finished plastic product are fed from a hopper 226 downwardly through feed throat 206 into barrel 204 for plasticizing conveyance by screw 202 into a mold, not shown in the drawings.

Mounted on the unnumbered frame of process machine 200 at the upward opening of feed throat 206 is an adaptor plate 208 on which hopper 226 rests and is secured thereto. A color feed conduit assembly 209 is positioned to feed liquid color downwardly, through feed throat 206, with the liquid color being discharged immediately adjacent to or against screw 202. Color feed conduit assembly 209 includes rigid outer color delivery support tube 210, which is preferably aluminum, and flexible inner color delivery tube 212 preferably in sliding telescoping engagement with outer color delivery support tube 210. The telescoping assembly of color feed conduit assembly 209, including rigid outer color delivery support tube 210 and flexible inner color delivery tube 212, is illustrated in FIG. 7.

Figure 7:
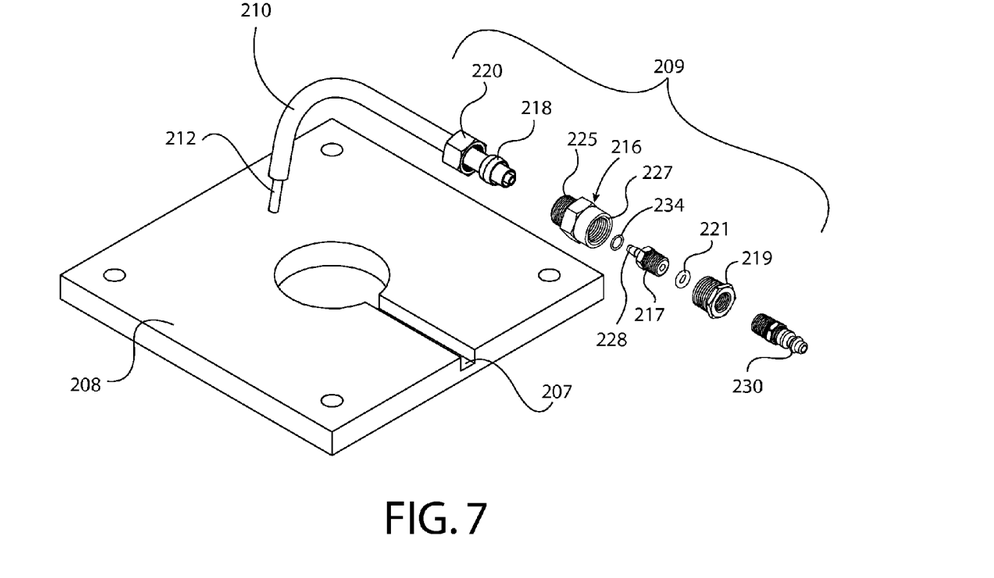
FIG. 7 is an exploded view of an adaptor plate and a portion of a color feed conduit assembly shown in FIG. 6 embodying aspects of the invention.

Further referring to FIG. 7, where the hardware connection of color feed conduit assembly 209 is shown in exploded form, the connection includes a compression nut 220 fitted about rigid outer color delivery support tube 210 and a ferrule 218 fitting about flexible inner color delivery tube 212. A compression fitting 216 has an end portion 225 adapted for threaded engagement with compression nut 220. Compression fitting 216 further includes a central portion of hexagonal configuration to be grasped by a wrench in order to rotate and thereby tighten or loosen compression fitting 216. The central hexagonal central portion of compression fitting 216 is not numbered in the drawings.

Compression fitting 216 further includes an internally threaded end portion 227, at the end opposite externally threaded end portion 225. A male connector fitting 217 includes a probe portion 228 adapted to fit into ferrule 218, which has an axial passageway through the center thereof for fluid communication with the interior of flexible inner color delivery tube 212. An o-ring 221 is provided for an effective seal as between male connector fitting 217 and a quick release straight through fitting 230. A washer 234 facilitates liquid-tight connection of male connector fitting 217 with compression fitting 216.

A threaded portion of male quick release straight through fitting 230, as illustrated, threadedly engages interior threads along and through the axial length of bushing 219 and extends sufficiently far to abut male connector fitting 217. As a result, o-ring washer 221 provides an effective seal, preventing leakage of any liquid color passing through the assembly from quick release straight through fitting 230 to flexible inner color delivery tube 212.

Quick release straight through fitting 230 is preferably a Parker BST-2M fitting, or the equivalent, available from numerous plumbing supply houses or directly from the manufacturer, Parker Hannifin Corporation in Minneapolis, Minn. Similarly, a suitable quick release non-drip female connector portion is available from Parker Hannifin.

A male swivel hose barbed fitting is designated 232 in the drawings. A washer 234 is provided as shown, as is a delivery tube first section 236, a delivery tube second section 238, which are connected by a "see-through" tubular connection 240. See-through tubular connection 240 includes an external sleeve 242. Tubular connection 240 further includes a male connector portion 244 and a female connector portion 246. Quick disconnect non-drip female connector 248 connects with the male portion of connector 230.

Liquid color flow to process machine 200 commences with pump 14 pumping liquid color from a drum 12 through color conveying tube 214 into flexible inner color delivery tube 212 portion of color feed conduit assembly 209. A first portion 236 of liquid color conveying tube 214 is preferably connected to an outlet from pump 14 by a barbed fitting 232, which in turn has been desirably screwed into a quarter-turn connector portion of pump 14. Liquid color conveying tube 214, particularly first segment 236 thereof, is pressed on to barbed fitting 232. At the other outlet end of liquid color conveying tube 214 is another barbed fitting, which is screwed into a female quick disconnect, which in turn pushes onto a male quick disconnect fitting 230 illustrated in FIG. 7. The female quick disconnect fitting has a built-in shutoff. Hence, when the female quick disconnect fitting is disconnected from the male quick disconnect 230 illustrated in FIG. 7, no liquid color will drip from of the outlet end of liquid color conveying tube 214.

Figure 1:
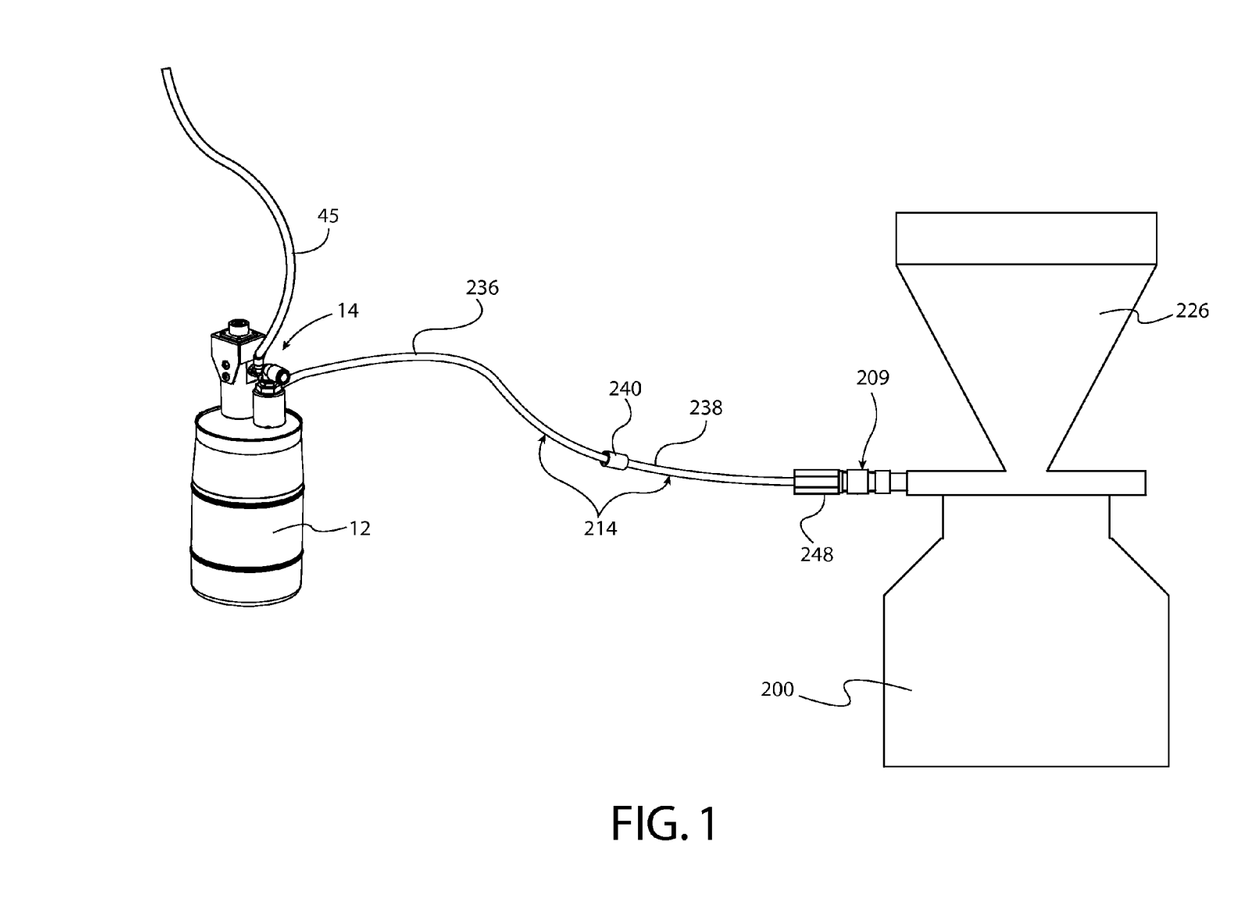
FIG. 1 is a schematic side elevation of apparatus embodying aspects of the invention.

As illustrated in FIG. 1 schematically, liquid color conveying tube 214 may have two or more segments; two are illustrated schematically in FIG. 1. These two segments are connected preferably by a see-through connector designated generally 240 in FIGS. 9 and 10. See-through connector 240 includes a male connector portion 244, which is pushed onto an outlet end of liquid color conveying tube first section 236.

See-through tubular connector 240 further includes a female connector portion, which is pushed into the inlet end of liquid color conveying tube second section 238. Male connector portion 244 and female connector portion 246 fit together via preferable threaded connections illustrated in FIGS. 10 and 11, where the threads on male portion 244 are clearly visible, but the threaded internal portion of female connector portion 246 has not been illustrated to enhance clarity of the drawings.

Figures 9, 10, 11:
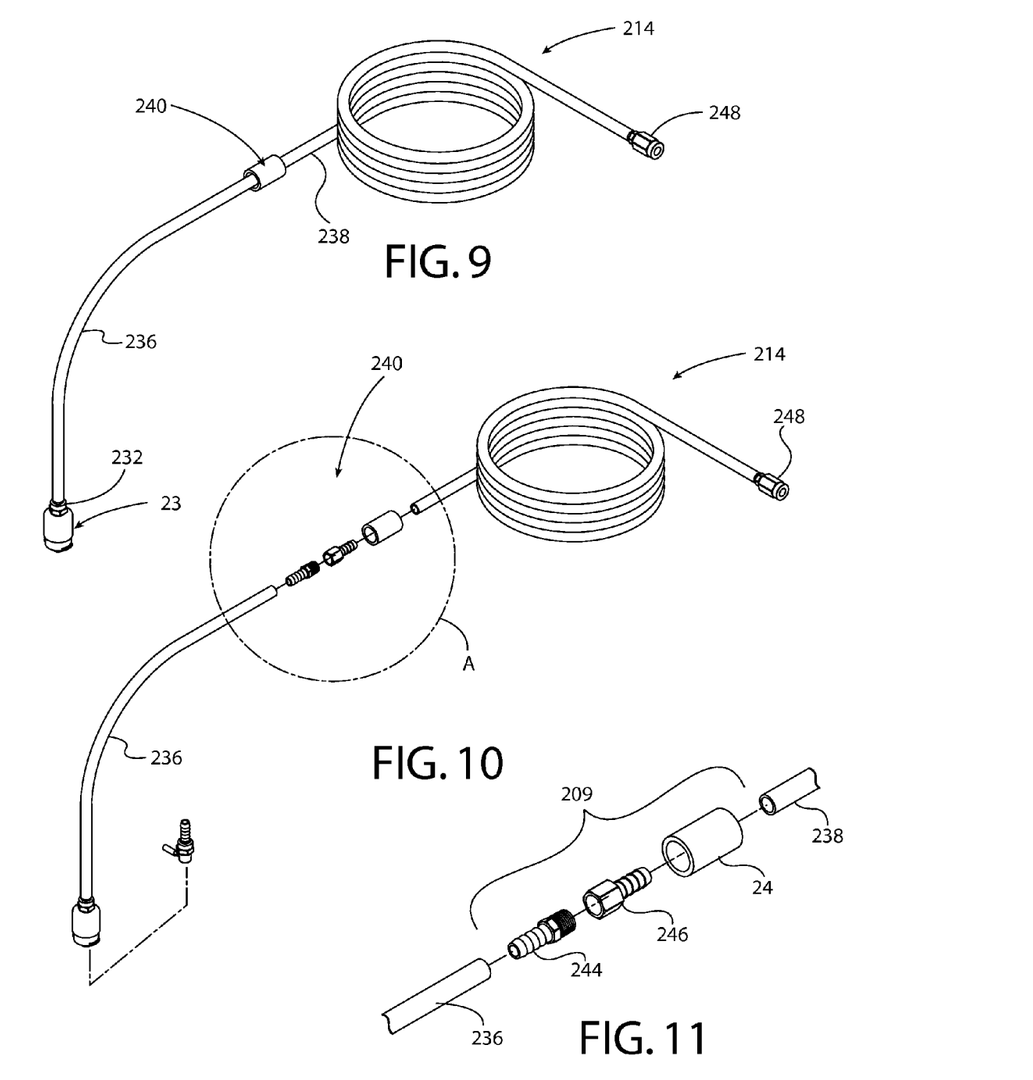
FIG. 9 is a schematic depiction in perspective of a liquid color delivery tube having first and second sections connected by a see-through connector.
FIG. 10 is a view similar to FIG. 9, with the see-through tubular connector shown in exploded form.
FIG. 11 is an enlarged exploded view of the see-through tubular connection illustrated in FIG. 9 and indicated by circle "A" in FIG. 10.

See-through tubular connection 240 further and finally includes a desirably transparent external sleeve 242 fitting over the threadedly engaged male and female connector portions 244, 246, and proximate portions of liquid color conveying tube first and second sections 236, 238, as illustrated in FIG. 9.

Figure 8:
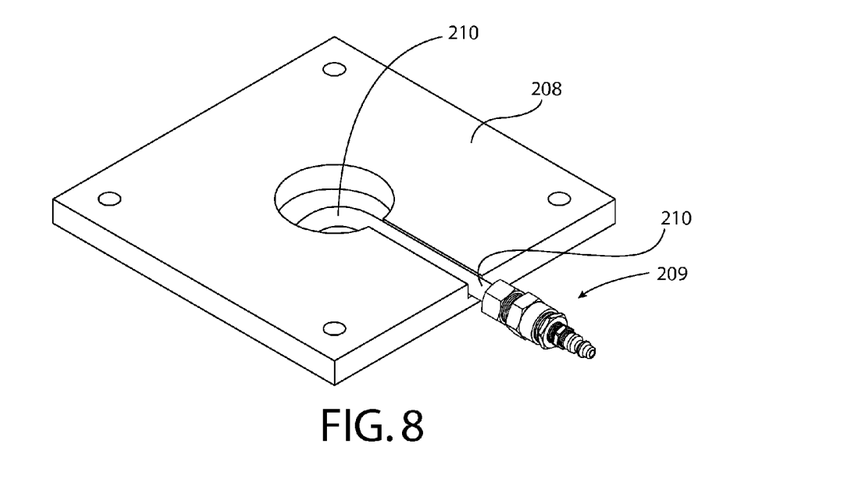
FIG. 8 is a view in the assembled condition of the adaptor plate and color feed conduit assembly portion illustrated in FIG. 7.

When the color feed conduit assembly 209 is assembled and positioned in adaptor plate slot 208 as illustrated in FIG.

8, the inlet to color feed conduit assembly 209, defined by the outwardly extending and protruding extremity of quick release straight-through male fitting 230, is positioned higher than the remaining portion of color feed conduit assembly 209, including (downstream) rigid outer color delivery support tube 210 and (downstream) flexible inner color delivery tube 212. Consequently, when liquid color conveying tube 214 is disconnected from color feed conduit assembly 209, no liquid color will drip from the open end of the passageway through quick release straight-through male fitting 230. Any liquid color present within any part of assembly 209 flows downwardly, from quick release straight-through male fitting 230, through the remaining portion of color feed conduit assembly 209, and down into process machine 200, exiting through the outlet end of flexible inner color delivery tube 212 proximate screw 202 of process machine 200.

No liquid color drips from the outlet end of liquid color conveying tube 214; female quick disconnect fitting 248 at the outlet end of tube 214 is equipped with an internal self-sealing shutoff. Similarly, connector portions 244 and 246, if used, of tubular connection 240, if used, are desirably equipped with internal self-sealing shut-offs such that upon any disconnect of see-through tubular connection 240, there is no dripping or loss of liquid color.

Liquid color pump 14 is desirably of the type disclosed in co-pending U.S. patent application Ser. No. 13/913,375 filed 7 Jun. 2013. Other suitable liquid color pumps for use as pump 14 are disclosed in U.S. Pat. Nos. 7,416,096; 7,390,119; 7,980,834; and 7,958,915.

An important feature of the invention is that whereby the color feed conduit assembly 209 has quick disconnect style connector 230 screwed into it, which couples with quick disconnect non-drip female connector portion 248, and has outer color delivery support tube 210 of assembly 209 with preferable Teflon brand polytetrafluoroethylene fluoropolymer inner tube 212 inserted into tube 210 of assembly 209, with inner tube 212 being a portion of assembly 209, and with inner tube 212 being held captive within outer tube 210 so that inner tube 212 does not need to be removed for color changes. Tube 210 is preferably secured to adaptor plate 208.

Liquid color conveying tube 214 has a quick disconnect shut-off installed on the outlet, where that shut-off is as quick disconnect non-drip female connector portion indicated by 248 in the drawings. When connector 248 is disconnected from counterpart connector 230, connector 248 seals shut and liquid color cannot drip from the outlet of liquid color conveying tube 214.

When the color needs to be changed, liquid color conveying tube 214 can be disconnected without liquid color dripping due to the presence of non-drip female connector portion 248 on the end of tube 214. The short length of color delivery tubing that remains in the machine, namely flexible inner color delivery tube 212, which is within rigid outer color delivery support tube 210, leads downwardly, as explained above, and is purged by the new color flowing downwardly therein. This short length of flexible inner color delivery tube 212, which is generally less than 16 inches with a small inside diameter of about 3/16 of inch or even less, results in flexible inner color delivery tube 212 cleaning out easily as it is purged by the incoming new liquid color. As a result of this short length of tube 212 and easy purging of tube 212 by the incoming new color, very few unacceptable parts are made when a color changeover occurs.

Liquid color conveying tube 214 is preferably 3/8 inch inside diameter polyethylene tubing, which is secured to the outlet of pump 14 by pressing on to a barbed fitting.

At the outlet end of liquid color conveying tube 214, for connection with quick disconnect non-drip female connector portion 248, is another barbed fitting that screws into quick disconnect non-drip female connector portion 248. (This barbed fitting has not been illustrated in the drawings to enhance drawing clarity.) Presence of quick disconnect non-drip female connector portion 248 assures no drip of liquid color when liquid color conveying tube 214 is disconnected from color feed conduit assembly 209 and hence from process machine 200.

The outlet end of flexible inner color delivery tube 212 may be actually in contact with screw 202, but more desirably is about 1/2 of an inch above screw 202. The outlet end of flexible inner color delivery tube 212 is preferably positioned near the forward end of the feed throat of process machine 200, preferably over the downstroke side of the screw 202.

I claim the following:

1. An apparatus for converting granular plastic resin into colored finished or semi-finished plastic parts, comprising:
   a. a process machine comprising:
      i. a barrel having a vertically opening feed throat;
      ii. a rotatable screw located inside the barrel;
      iii. a plate covering the feed throat, having an aperture therethrough and a slot formed therein extending from the aperture to an edge of the plate;
   b. a color feed conduit assembly positioned at least partially within the process machine and extending into the barrel for passage of liquid color downwardly through the color feed conduit assembly into proximity with the screw, comprising:
      i. a relatively rigid aluminum outer color delivery tube;
      ii. a relatively flexible inner color delivery tube telescopically disposed within the outer color delivery tube;
   the color feed conduit assembly being positioned at least partially in the slot in the plate extending from the aperture to the edge of the plate and passing downwardly through the aperture with an outlet of the color feed assembly being in proximity with the screw;
   c. a color conveying tube;
   d. a self-sealing quick release fitting connecting the color conveying tube to the color feed conduit assembly;
   e. a pump for pumping liquid color from a supply thereof remote from the process machine through the color conveying tube and the color feed conduit assembly into proximity with the rotatable screw.

2. Apparatus of claim 1 wherein the inner color delivery tube is a fluoropolymer and extends beyond the outer color delivery tube and an outlet end of the color feed conduit assembly.

3. Apparatus of claim 2 wherein the inner color delivery tube extends at least 1 inch beyond the outer color delivery tube at the outlet end of the color feed conduit assembly.

4. Apparatus of claim 1 wherein the inner color delivery tube has a one-quarter inch outer diameter.

5. Apparatus of claim 1 wherein the inner color delivery tube is nylon.

6. Apparatus of claim 1 wherein the inner color delivery tube contacts the screw.

7. An apparatus for feeding liquid color to a process machine for converting granular plastic resin into finished or semi-finished plastic parts by molding or extrusion, the process machine having a rotatable screw located inside a barrel, the barrel having a vertically opening feed throat with a plate covering the feed throat, the plate having an aperture therethrough with a feed tube positioned therein for passage of liquid color downwardly through the tube into proximity with the screw, comprising:
- a. a color feed conduit assembly comprising:
  - i. a rigid aluminum outer color delivery tube;
  - ii. an inner flexible polymeric color delivery tube telescopically disposed within the outer color delivery tube;
  - iii. the color feed conduit assembly being positioned at least partially in a slot in the plate extending from the aperture to an edge of the plate and passing downwardly through the aperture, with an outlet of the color feed assembly being in proximity with the screw;
- b. a color conveying tube;
- c. a self-sealing quick release fitting connecting the color conveying tube to the color feed conduit assembly; and
- d. a pneumatically powered pump for pumping liquid color from a supply thereof remote from the process machine through the color conveying tube and the color feed conduit assembly into proximity with the rotatable screw.

8. Apparatus of claim 7 wherein the inner color delivery tube extends beyond the outer color delivery tube and an outlet end of the color feed conduit assembly.

9. Apparatus of claim 8 wherein the inner color delivery tube extends at least 1 inch beyond the outer color delivery tube at the outlet end of the color feed conduit assembly.

10. Apparatus of claim 7 wherein the inner color delivery tube has a one-quarter inch outer diameter.

11. Apparatus of claim 7 wherein the inner color delivery tube is polytetrafluoroethylene.

12. Apparatus of claim 7 wherein the inner color delivery tube is nylon.

13. Apparatus of claim 7 wherein the inner color delivery tube contacts the screw.

14. Apparatus of claim 7 wherein the inner color delivery tube has an inner diameter of about $3/16$ inch.

15. Apparatus of claim 7 further comprising a compression fitting securing the inner tube in place relative to the outer tube.

16. An apparatus for converting granular plastic resin into colored finished or semi-finished plastic parts, comprising:
- a. a process machine comprising:
  - i. a barrel having a vertically opening feed throat;
  - ii. a rotatable screw located inside the barrel;
- b. a color feed conduit assembly positioned at least partially within the process machine and extending into the barrel for passage of liquid color downwardly through the color feed conduit assembly into proximity with the screw, comprising:
  - i. a relatively rigid aluminum outer color delivery tube;
  - ii. a relatively flexible inner color delivery tube telescopically disposed within the outer color delivery tube;
  the color feed conduit assembly passing downwardly through the feed throat with an outlet of the color feed assembly being in proximity with the screw;
- c. a color conveying tube;
- d. a self-sealing quick release fitting connecting the color conveying tube to the color feed conduit assembly.

17. Apparatus of claim 16 wherein the inner color delivery tube is a fluoropolymer and extends beyond the outer color delivery tube and an outlet end of the color feed conduit assembly.

18. Apparatus of claim 17 wherein the inner color delivery tube extends at least 1 inch beyond the outer color delivery tube at the outlet end of the color feed conduit assembly.

19. Apparatus of claim 16 wherein the inner color delivery tube is one-quarter inch outer diameter.

20. Apparatus of claim 16 wherein the inner color delivery tube is nylon.

21. Apparatus of claim 16 wherein the inner color delivery tube contacts the screw.

22. Apparatus of claim 16 wherein an inner diameter of the color delivery tube is about $3/16$ of an inch.

23. An apparatus for feeding liquid color to a process machine for converting granular plastic resin into finished or semi-finished plastic parts by molding or extrusion, the process machine having a rotatable screw located inside a barrel, the barrel having a vertically opening feed throat with a plate covering the feed throat, the plate having an aperture therethrough with a feed tube positioned therein for passage of liquid color downwardly through the tube into proximity with the screw, comprising:
- a. a color feed conduit assembly comprising:
  - i. a rigid aluminum outer color delivery tube;
  - ii. an inner flexible polymeric color delivery tube telescopically disposed within the outer color delivery tube;
  - iii. the color feed conduit assembly being positioned at least partially in a slot in the plate extending from the aperture to an edge of the plate and passing downwardly through the aperture, with an outlet of the color feed assembly being in proximity with the screw;
- b. a color conveying tube;
- c. a self-sealing quick release fitting connecting the color conveying tube to the color feed conduit assembly; and
- d. a pneumatically powered diaphragm pump for pumping liquid color from a supply thereof remote from the process machine through the color conveying tube and the color feed conduit assembly into proximity with the rotatable screws;

wherein the inner color delivery tube extends beyond the outer color delivery tube and an outlet end of the color feed conduit assembly;

the inner color delivery tube extends at least 1 inch beyond the outer color delivery tube at the outlet end of the color feed conduit assembly;

the inner color delivery tube has a one-quarter inch outer diameter;

the inner color delivery tube is polytetrafluoroethylene;

the inner color delivery tube is nylon;

the inner color delivery tube contacts the screw;

the inner color delivery tube has an inner diameter of about $3/16$ inch; and further comprising a compression fitting securing the inner tube in place relative to the outer tube.

* * * * *